United States Patent Office 3,408,995
Patented Nov. 5, 1968

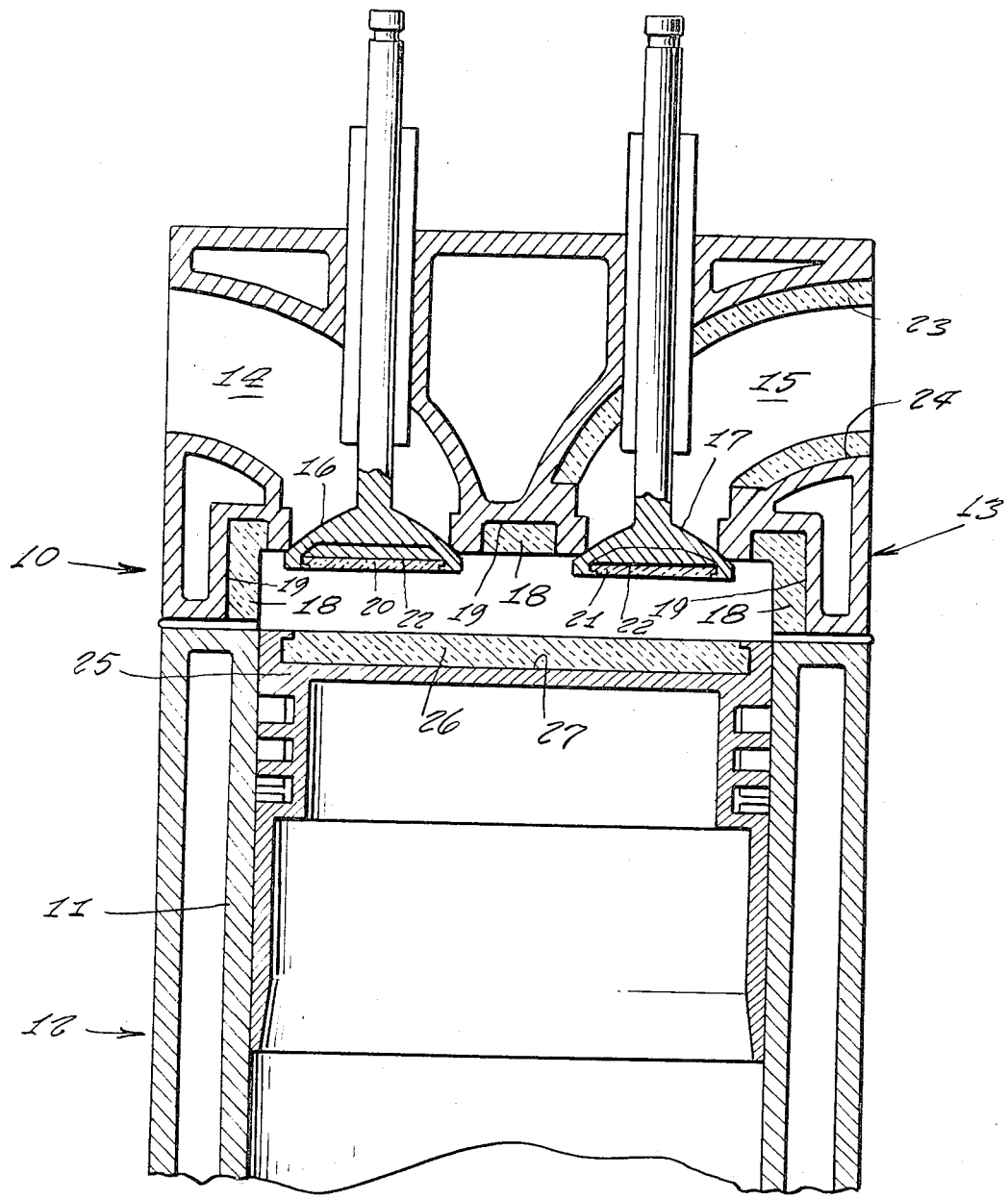

3,408,995
COMBUSTION CHAMBER DESIGN AND MATERIAL FOR INTERNAL COMBUSTION CYLINDERS AND ENGINES
Thomas A. Johnson, 1316 Emerson Lane, Milford, Ohio 45150
Filed May 22, 1967, Ser. No. 640,000
1 Claim. (Cl. 123—191)

ABSTRACT OF THE DISCLOSURE

A ceramic insulating material for engine combustion chamber surfaces, including the surfaces of cylinder heads, piston heads, intake and exhaust valve heads, and exhaust passages for a multitude of advantages.

This invention relates generally to internal combustion engines.

A principal object of the present invention is to provide a ceramic insulating material on the surfaces of a combustion chamber of an engine, and which is fastened to and inserted into the surfaces of the cylinder head, piston head, intake and exhaust valve heads, and exhaust passage surfaces.

Another object is to provide a ceramic insulating material that is fastened to these parts by bonding to the surfaces or by means of provided flanges.

Another object is to provide a ceramic insulating material so to raise the surface temperature on these parts confining the burning fuel-air mixture.

Yet another object is to provide a ceramic insulation lining which in the exhaust passage will decrease the conduction of waste heat to the cooling system and to maintain the high temperature of the exhaust gases so to aid in their complete combustion.

Yet another object is to provide a ceramic insulating material that is adaptable for use in two cycle, four cycle, air cooled, liquid cooled, carburator, fuel injection fueled, and diesel engines.

Yet other objects are to provide a ceramic insulating material for engine combustion chamber surfaces which will prevent or decrease formation of free carbon, eliminate carbon deposits on combustion chamber surfaces, decrease presence of free carbon in the exhaust gases, permit use of higher air to fuel ratio mixture, permit waste heat to be swept out of combustion chamber through the insulated exhaust passage, reduce heat loss from combustion chamber to cooling system, permit smaller cooling system design, allow quicker warm up period for the engine, require no maintenance, and which will prevent the burning fuel-air mixture to contact the metal surfaces of the combustion chamber.

Other objects are to provide an improved combustion chamber design which is simple in design, inexpensive to manufacture, rugged in construtcion, easy to use and efficient in operation.

These and other objects will be readily evident upon a study of the following specification and the accompanying drawing wherein:

The sole figure represents a cross sectional elevation view of an internal combustion chamber of an engine showing the invention incorporated therein.

Referring now to the drawing in detail, the reference numeral 10 represents an improved combustion chamber design according to the present invention wherein there is a cylinder 11 of an engine 12. The cylinder has a head 13 having an intake passage 14 and an exhaust passage 15, having an intake valve head 16 and an exhaust valve head 17 respectively for sealing the opening thereof into the combustion chamber 10.

In the present invention, the cylinder head 13 is provided with a liner 18 made of ceramic insulating material to shield the surfaces 19 of the head. The liner 18 may be either bonded or inserted to the chamber surface.

In like manner, the intake valve head and the exhaust valve heads are provided with ceramic insulating liners 20 and 21 respectively, fitted against valve head surfaces 22.

The exhaust passage is also provided with ceramic insulating liner 23 fitted against passage surface 24.

The piston head 25 is also provided with ceramic insulating liner 26 fitted against piston head face 27.

In operative use, the burning air-fuel mixture does not contact the surfaces of the combustion chamber wall, piston head, valve heads, and exhaust passage wall.

While various changes may be made in the detail construction, it is understood that such changes will be within the spirit and scope of the present invention.

Having thus set forth and disclosed the nature of this invention, what is claimed is:

1. In an improved combustion chamber assembly, the combination of an engine combustion chamber, an intake and an exhaust passage communicating with said chamber, valve heads in the openings to said passages from said chamber, and a piston head slidable in a cylinder adjacent and communicating with said chamber; said chamber, said exhaust passage, and a face of said piston head and valve heads facing said chamber having surface means to reduce and prevent the formation and emission or exhausting of unburned carbon, said surface means comprising ceramic insulation material inserted into the said parts; said insulation inserted into said piston head and valve heads being secured by a radially inwardly turned flange of each said head into a peripheral groove formed on each insulation thus securing said insulation on said head and forming a flush unprotruding face.

References Cited

UNITED STATES PATENTS

| | | |
|---|---|---|
| 1,490,849 | 4/1924 | Philip. |
| 1,462,654 | 7/1923 | Philip. |
| 1,812,870 | 7/1931 | Goldsborough. |
| 1,835,971 | 12/1931 | Schattanek. |

WENDELL E. BURNS, *Primary Examiner.*